United States Patent [19]

Maffet

[11] 4,128,946
[45] Dec. 12, 1978

[54] ORGANIC WASTE DRYING PROCESS

[75] Inventor: Vere Maffet, Oak Park, Ill.

[73] Assignee: UOP Inc., Des Plaines, Ill.

[21] Appl. No.: 775,673

[22] Filed: Mar. 8, 1977

[51] Int. Cl.² .................................................. F26B 7/00
[52] U.S. Cl. ........................................ 34/12; 44/10 R; 71/12
[58] Field of Search .......................... 34/12, 60, 61, 62; 110/8 P, 224; 44/10 R, 10 E, 10 F; 71/12, 13, 14

[56] References Cited

U.S. PATENT DOCUMENTS

| 2,977,214 | 3/1961 | McLellan | 71/12 |
| 3,667,131 | 6/1972 | Stephanoff | 34/10 |
| 4,003,136 | 1/1977 | Vincent et al. | 34/12 |
| 4,057,392 | 11/1977 | O'Donnell | 23/259.1 |

Primary Examiner—John J. Camby
Attorney, Agent, or Firm—James R. Hoatson, Jr.; John F. Spears, Jr.; William H. Page, II

[57] ABSTRACT

A process for drying organic waste, such as sewage sludge, by contacting the organic waste with hot vapors wherein the dried material is extruded to form compacted granules having good flow characteristics and suitable for application by commercial fertilizer spreaders.

7 Claims, 1 Drawing Figure

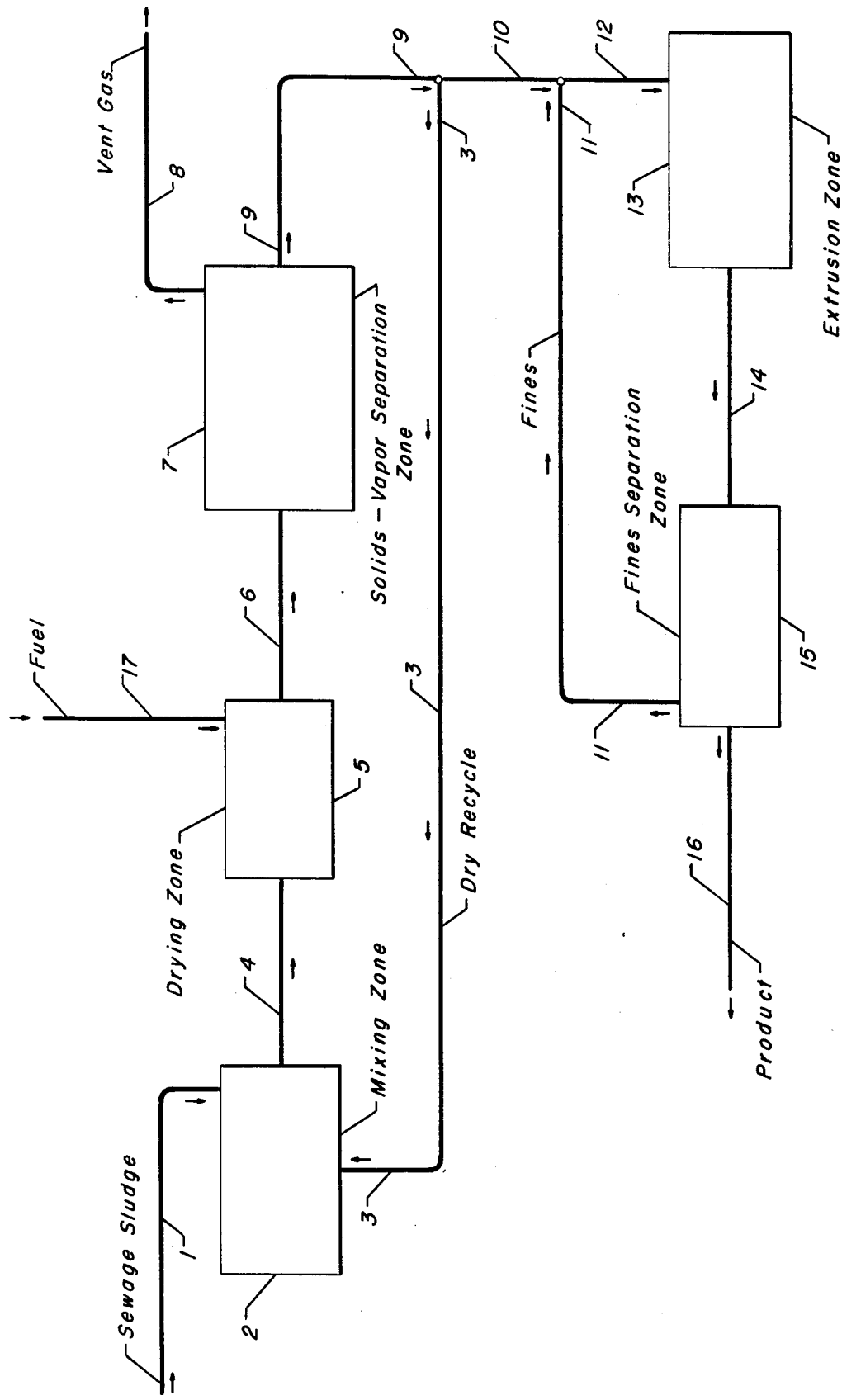

ORGANIC WASTE DRYING PROCESS

FIELD OF THE INVENTION

The invention relates to the drying of solid material by contacting the solid material with hot vapors. The invention also relates to the drying of organic waste such as sewage sludge and to the production of fertilizer or soil builders from organic waste. The invention more specifically relates to the conversion and finishing of the dried material to a more commercially acceptable and marketable form by pelletization in an extruder.

PRIOR ART

The large amounts of organic waste which are produced annually and the need to dispose of this waste have prompted attempts to develop economic organic waste disposal methods. Increasingly stringent environmental standards have also acted as a stimulus to their development. One well known method is that utilized in metropolitan Milwaukee, Wis., to dry municipal sewage sludge to produce an organic plant food called Milorganite. It is believed that the sludge is dried by the use of large rotating kilns through which hot vapors are passed. A different system in which a flash dryer is used is in operation in Houston, Tex. It is therefore known in the art to dry organic waste by contact with hot vapors.

The prior art processes have two other features in common with the subject process. First, the vaporous effluent of the drying zone is often passed into a solids-vapor separation zone to collect or remove particles of the solid product. This zone typically comprises one or more cyclone-type separators. Second, it is known in the art to recycle a portion of the dried product and to admix this dry material with the incoming feed material to form a somewhat drier charge material which is fed to the drying zone. This procedure is primarily intended to expedite the feeding of the organic waste into the drying zone and to lessen accumulation of the raw waste material on the walls of the drying zone.

The preferred toroidal drying zone is well described in the literature. It is described for instance in U.S. Pat. Nos. 3,329,418 (Cl. 263-21); 3,339,286 (Cl. 34-10); 3,403,451 (Cl. 34-10); 3,546,784; 3,550,921 (Cl. 263-53); 3,648,936 (Cl. 241-5); 3,667,131; 3,856,215 (Cl. 241-39); 3,922,796 and 3,945,130. The use of such a dryer in a process for the treatment of organic wastes is taught in U.S. Pat. No. 3,802,089 (Cl. 34-8). This reference shows the discharge of the toroidal dryer being directed into a cyclone separator and the recycling of the separator off-gas to the drying zone. The preferred toroidal dryer may be essentially the same in structure as the size reduction apparatus referred to as a fluid energy or jet mill. This apparatus is described at pages 8-43 of the 4th edition of the *Chemical Engineers' Handbook* published by McGraw-Hill Book Co., 1963. The subject dryer is operated in a manner similar to many of these mills except for the use of heated gas streams as the high-velocity streams charged to the apparatus.

It is believed that heretofore the effluent of the drying zone has not been extruded. Instead, it has typically been compressed as in a roller compacting mill to form sheets or flakes which were then passed into a crushing or granulating device. The resultant granules are then screened to remove fines and oversized particles which are recycled. Material produced in this manner normally has poor flow characteristics and is difficult to mix and to apply with any conventional equipment.

BRIEF SUMMARY OF THE INVENTION

The invention provides an improved process for drying solid organic wastes by contact with a hot vapor. The invention also provides an improved finishing operation for use with such a process. The subject drying process includes the steps of collecting dried solid waste particles from the effluent of the drying zone and then passing the dried material through an extrusion zone. The process thereby provides a more uniform product than the prior art compaction methods and also reduces the amount of product which is of an unacceptable size and which must be recycled to the compaction/breaking equipment.

DESCRIPTION OF THE DRAWING

To ensure a complete understanding of the inventive concept, a schematic illustration of the preferred embodiment is presented in the Drawing. In this embodiment an organic waste stream comprising fibrous sewage sludge from a municipal treatment center and containing about 20% by weight solids is fed into the process in line 1. This material is passed into a mixing zone 2 and commingled with a fluffy dry recycle material from line 3. The resultant feed stream is passed into the drying zone 5 through line 4 and contacted in a toroidal dryer with a stream of hot vapors. These vapors are generated by the combustion of fuel entering the process via line 17 with air from a source not shown. Preferably, the combustion products are used to form at least part of the hot vapors and are passed directly into the dryer. The drying zone effluent stream carried by line 6 therefore contains the dried solid particles contained in the sewage sludge of line 1, combustion products and the additional water vapor driven off the dried sludge.

The drying zone effluent stream is passed into a solids-vapor separation zone 7 wherein the combustion products and water vapor are concentrated into a vent gas stream removed from the process in line 8. The solid particles of dried sludge are collected as a dry solids stream transported in line 9. Preferably this separation of the solids and vapors is effected through the use of one or more cyclone-type separators. A first portion of the dry solids stream is passed into line 10 and mixed with a recycle fines stream from line 11. This portion of the dry solids stream is then passed through line 12 into an extrusion zone 13. In this zone the dry solids are compacted and pushed through a die to produce pellets having an average bulk density which is about 2-4 times greater than that of the unpelleted dry solids. These pellets are removed in line 14 as a product stream. As a second finishing step the product stream is then passed through a fines separation zone 15 wherein by air blowing or screening any dust, undersized particles, and oversized particles are removed. The fines are passed through line 11 and the finished product is removed in line 16.

DETAILED DESCRIPTION

The drying of organic waste is normally a multistep process which may be discussed in terms of the separate operations and their interaction. The overall objective of the drying procedure is to dispose of the organic waste and to convert it to a useful and preferably marketable product. In the subject process the organic waste is dried and formed into pellets which may be sold as fertilizer or soil conditioner. The inventive concept is mainly concerned with the step of forming the dried material into pellets, but the other steps will be described in some detail to provide a basis for understanding the invention.

As used herein the term "organic waste" is intended to refer to carbon-containing substances that are derived directly from living or formerly living organisms. Specific examples include human sewage, fat, meat scraps, bones, hair, skin, feces and manure from animal sources, beet pulp, fruit pumice, vegetable and fruit peels and culls, eggs, straw and animal bedding, bagasse, fermentation and distillation residues from vegetable sources, cellulose and protein production plant effluents, kelp and pharmaceutical wastes. In the preferred embodiment the feed stream to the process comprises a sewage sludge produced in a municipal sewage treatment plant. It may be a primary, secondary, or tertiary sludge, which is digested or undigested. Preferably the feed stream to the process contains about 20 wt.% or more solids.

These organic wastes may be dried to form a slow release fertilizer and soil builder. In order to distribute such a fertilizer in the large scale operations of modern commercial agriculture, it is necessary to utilize mechanical spreaders, for which reason the fertilizer particles should be relatively dense and approximately uniform in size and shape. In the prior art the dried organic waste was compressed to solid pieces which were then crushed to form particles of various sizes and shapes. This method also formed sizable amounts of dust. The product particles then had to be sized as by screening with the off-size material being recycled. The amount of this off-size material has reached over 50% of the material being compressed. It is an objective of this invention to provide a process for drying organic waste wherein the product has a relatively uniform size and shape. It is another objective of the invention to provide a process for drying organic waste wherein the product is relatively dense. Another objective is to provide a granular material with good flow characteristics. It is yet another objective of the invention to provide an improved process for the drying of organic waste which produces a particulate product without extensive crushing of the dried organic waste.

Basic to the subject process is the use of a drying zone. This may be any mechanical contrivance in which the organic waste is dried. The dryer may be either a direct or indirect dryer and may operate in a batch or continuous mode. The drying may therefore be effected by contacting the organic waste with a hot surface with intermittent or continuous agitation, but it is preferably accomplished by contacting the organic waste with a hot, relatively dry vapor. There are several ways in which this preferred drying may be performed. For instance, the organic waste may be passed into the raised end of a rotating cylindrical kiln while hot dry vapors are passed into the lower end. Other drying systems such as a flash-cage dryer may be used.

In the preferred embodiment, the drying zone comprises a toroidal dryer. As used herein the term "toroidal dryer" is intended to refer to a dryer in which the material to be dried is passed into an enclosed circular housing wherein the wet material is caused to circulate by hot vapors which are charged to the dryer. It is therefore intended to refer to a dryer similar to that described in the previously cited references including U.S. Pat. Nos. 3,802,089; 3,329,418; 3,403,451; 3,667,131 and 3,856,215. The material to be dried is normally passed into a lower point in a vertically oriented dryer housing and caused to move horizontally by the hot vapors. The wet material is then circulated around the vertically aligned circular loop of the dryer, with dry material being selectively removed with effluent vapors. The drying conditions used in the drying zone include a pressure which may range from subatmospheric to about 7 atmospheres gauge. Preferably, the drying zone is operated at a slight positive pressure with a toroidal dryer. This pressure may be in the range of from about 0.1 to 0.6 atmospheres gauge. This pressure is required for transportation of the solids.

The drying zone may be supplied the heat required to effect the drying from any suitable source. It may therefore be supplied by electricity or by a nuclear power plant. The preferred heating method is the combustion of a relatively sulfur-free carbonaceous fluid such as a desulfurized fuel oil or natural gas. Preferably, the combustion is completed prior to the contact of the resultant hot vapors with the organic waste. The temperature of the hot vapors fed to the dryer may vary from about 500° to 1350° F. A preferred range for this temperature is 750° to 1250° F.

It has been found by experience that a feed stream being fed to a toroidal dryer should contain at least about 50 wt.% solids. Preferably, it contains about 55 to 70 wt.% solids. This degree of dryness is desirable to prevent portions of the feed stream from depositing on the internal surfaces of the dryer. That is, a soupy feed stream has a tendency to plaster against the walls of the dryer with at least a portion remaining there as an undesired coating. The normal method of increasing the solids content of wastes such as municipal sludge is to recycle a portion of the dryer effluent. A representative recycle ratio is the addition of 7 lbs. of dried solids collected from the dryer effluent to 5 lbs. of sludge containing about 20 wt.% solids. This recycle rate will, of course, be adjusted for other solids contents in the organic waste stream fed to the process.

An alternative to the recycling of dried solids is the dewatering of the organic waste stream fed to the process. This can be done in several ways. For instance, U.S. Pat. No. 3,984,329 (Cl. 210-396) presents a conveyor-type sludge filtering device. Other types of presses and filters including those utilizing a vacuum or centrifugal force to promote drainage may be used.

The effluent stream of the dryer will contain the dried organic wastes. This material preferably has a water content of about 5-12 wt.%, but higher water contents up to about 15 wt.% may be tolerable. When the drying is achieved through the use of hot vapors, these vapors will also exit the drying zone and will normally contain some entrained fine waste particles. The effluent of the drying zone is therefore passed into a solids-vapor separation zone. This zone preferably contains one or more cyclone separators. Most of the dried waste will be collected by these cyclones. The off-gas of the cyclones may be directed into a wet scrubber such as a turbulent contact absorber or bag-type filter. The filtered off-gas is then passed through an odor scrubber in which contact with deodorizing chemicals including hypochlorites, peroxides, or permanganate can be effected if necessary. An incineration-type odor scrubber may also be used. When the preferred toroidal dryer is used, the dried solids will be removed from the dryer suspended in the warm effluent vapors and passed to the separation zone. These effluent vapors will also comprise the evaporated water and combustion products. They may range in temperature from about 190° to 400° F. and are preferably in the range of 200°-300° F. This separatory zone may be of customary design, and those skilled in the art are capable of effecting its design and operation.

The dried organic waste is normally a fluffy material having a bulk density of about 12 to 16 lb/ft$^3$. The dried material produced from sewage sludge also tends to adhere to itself and does not readily flow or spread. It is therefore difficult to transport or to spread as fertilizer. For these reasons it has been compacted to form a particulate product having an average bulk density of about 30 to 65 lb/ft$^3$. Preferably, the density of the product is about 30 to 50 lb/ft$^3$. The sequential compaction and crushing operations of the prior art did accomplish the necessary compaction. However, the required machines were relatively expensive, troublesome, and often unreliable. Further, the product frequently still has poor flow characteristics. The prior art method also produces a large amount of off-size material as described above. It has now been found that these disadvantages of the prior art can be largely eliminated by extruding the dry material formed in the drying zone.

The invention may therefore be characterized as a process for drying a feed stream comprising water and organic waste which comprises the steps of passing the feed stream into a drying zone operated at drying conditions and effecting the evaporation of water contained in the feed stream and the production of a drying zone effluent stream; separating the drying zone effluent stream in a solids-vapor separating zone to produce a vapor stream comprising water vapor and a dry solids stream comprising organic waste and containing less than about 15 wt.% water; and extruding a first portion of the dry solids stream in an extrusion zone to form a product stream having a bulk density within the range of about 30-65 lb/ft$^3$.

The extrusion of the dry fluff may be performed in a customary manner using several types of extruders including press-type extruders or the roller and die-type often used in pelleting operations. The preferred type of extrusion apparatus uses a screw or auger to force the dried organic waste through a face plate having perforations in the range of 1/16- to ¼-inch diameter. The action of the screw within the barrel of the extruder results in the shearing and kneading of the dried waste, and the waste therefore may be fluxed to a plasticized material within the barrel, with the plasticized material solidifying upon discharge from the extruder. This plasticizing is believed to be at least in part responsible for the improved performance of the subject process. The dried waste may be fed to the extruder at elevated temperatures up to about 200° F. to promote fluxing. Uniform pellet formation may be aided by the use of a rotating finger plate.

The extrudate is then passed into a particle classification or fines separation zone. The zone may comprise any apparatus which will remove dust, fine particles, and oversized particles from the extrudate. One such apparatus comprises a screening mechanism having two vibrating screens to sort out those particles which will not pass through a 6 mesh screen and also those that pass through a 20 mesh screen. The remaining product is referred to as "minus 6 plus 20" and is typical of the size range preferred in fertilizer production. The oversize may be crushed in any suitable manner and returned to the screens. The fines are recycled to the feed of the extruder. A second type of apparatus which may be used is one which utilizes fluidization of the fine particles in air as a means of particle classification. The apparatus presented in U.S. Pat. No. 3,825,116 performs fine particle separations in this manner. Cyclone separators may also be used to separate the fine particles.

Use of the subject method has resulted in the total amount of off-size material which must be recycled being below 25%. This reduction is significant compared to the prior art, and allows the process to operate at higher throughput than can be achieved with conventional compaction equipment. It also decreases the required size and utility consumption of the off-size particle recycle system. These advantages are in addition to the lower cost and increased reliability of the extruder. There is also some indication that extrusion results in a product which may be stabilized at a higher water content. Normally, the dried sludge starts to ferment or "germinate" if stored at water contents above 10–12%. If a higher water content can be tolerated in the product, the required amount of drying is reduced, fuel is conserved, and the process is more economical. The total new process therefore appears synergistic. The invention therefore achieves its objectives of providing an improved process for the drying and finishing of organic wastes.

I claim as my invention:

1. In a process for the drying of fibrous sewage sludge wherein a feed stream comprising water and fibrous sewage sludge is passed through a drying zone operated at drying conditions and effecting the evaporation of water contained in the feed stream and the production of a drying zone effluent stream, the drying zone effluent stream is passed into a solids-vapor separation zone wherein fibrous sewage sludge originally contained in the feed stream is concentrated in a dry solids stream, and at least a portion of the dry solids stream is compacted and formed into solid particles having a bulk density within the range of about 30–65 lb/ft$^3$ the improvement which comprises passing said portion of the dry solids stream which is to be compacted through an extrusion zone wherein said portion is passed through a die plate and formed into pellets of a desired size and density.

2. A process for drying a feed stream comprising water and organic waste which comprises the steps of:
  (a) passing the feed stream into a drying zone operated at drying conditions and effecting the evaporation of water contained in the feed stream and the production of a drying zone effluent stream comprising particulate organic waste and water;
  (b) separating the drying zone effluent stream in a solids-vapor separating zone to produce a vapor stream comprising water vapor and a dry solids stream comprising fibrous sewage sludge and containing less than about 15 wt.% water; and,
  (c) extruding a first portion of the dry solids stream in an extrusion zone to form a product stream having a bulk density within the range of about 30–65 lb/ft$^3$.

3. The process of claim 2 wherein the first portion of the dry solids stream is plasticized within the extrusion zone.

4. The process of claim 3 wherein the feed stream is formed by admixing a second portion of the dry solids stream with an organic waste stream comprising organic waste and water.

5. The process of claim 2 wherein the organic waste contained in the dry solids stream has a bulk density of less than about 16 lb/ft$^3$.

6. The process of claim 4 wherein the drying zone comprises a toroidal dryer.

7. The process of claim 6 wherein the product stream is passed into a fines separation zone wherein particles of less than 20 mesh size are separated into a recycle stream, and the recycle stream is admixed with the first portion of the dry solids stream.

* * * * *